3,505,338
THIOPHENECARBONYLALKYLENE-DIAMINES
William Blythe Wright, Jr., Woodcliff Lake, N.J., and Herbert Joseph Brabander, Nanuet, N.Y., assignors to American Cyanamid Company, Stamford, Conn., a corporation of Maine
No Drawing. Continuation-in-part of application Ser. No. 596,831, Nov. 25, 1966. This application Jan. 15, 1968, Ser. No. 697,611
Int. Cl. C07d 51/70
U.S. Cl. 260—293.4      4 Claims

ABSTRACT OF THE DISCLOSURE

Preparation of substituted N-(tert.-aminoalkyl)thiophenecarboxamides by reacting a halogen, lower alkylsulfonyloxy or monocyclic arylsulfonyloxy substituted alkylenethiophenecarboxamide with a substituted arylheterocyclic compound, is described. Other methods of preparing substituted N-(tert.-aminoalkyl)thiophenecarboxamides are described. The substituted N-(tert.-aminoalkyl) thiophenecarboxamides are useful for their central nervous system (CNS) depressant properties.

---

This invention is a continuation-in-part of our copending application Ser. No. 596,831, filed Nov. 25, 1966, now abandoned.

SUMMARY OF THE INVENTION

This invention relates to new organic compounds. More particularly, it relates to N-(tert.-aminoalkyl)thiophenecarboxamide derivatives and methods of preparing the same.

The novel compounds of the present invention may be illustrated by the following formula:

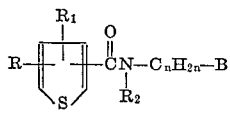

wherein R and $R_1$ are selected from the group consisting of hydrogen, lower alkyl and halogen; $R_2$ is selected from the group consisting of hydrogen, lower alkyl, and lower alkenyl; $n$ is an integer from 2 to 4 and B is selected from

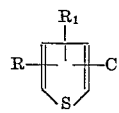

the group consisting of 1-aryl-4-piperazinyl, 4-arylpiperidino and 4-aryl-3,6-dihydro-1(2H)-pyridyl, in which the aryl group is selected from the group consisting of phenyl, lower alkoxyphenyl, lower alkylthiophenyl, lower alkylphenyl, halophenyl, and trifluoromethylphenyl; and the pharmaceutically acceptable acid addition salts thereof.

The free bases of this invention may be either liquids or solids at room temperature. The free bases are, in general, relatively insoluble in water, but soluble in most organic solvents such as lower alkyl alcohols and esters, acetone, chloroform, and the like. These compounds form acid addition salts with strong acids, such as hydrochloric acid, sulfuric acid, perchloric acid, and the like. The compounds also form salts with organic acids, as for example, fumaric and maleic acid. Such salts, in general, are soluble in water, methanol and ethanol, but relatively insoluble in benzene, ether, petroleum ether, and the like.

The compounds of this invention are preferably prepared by the following method.

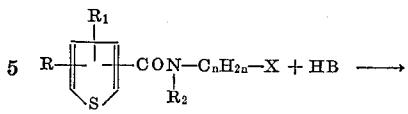

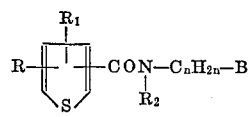

wherein R, $R_1$, $R_2$, B and $n$ are as defined above and X is a halogen, loweralkylsulfonyloxy or monocyclic arylsulfonyloxy radical. The reaction takes place when the reagents are contacted in an inert solvent such as ether, tetrahydrofuran, toluene, benzene and the like, and the reagent mixture is maintained within the temperature of from about 50° to 150° C. for a period of 10 minutes to several hours.

The compounds of the present invention can also be prepared by other methods. One of these involves the preparation of a reactive thiophenecarboxamide as an intermediate followed by reaction with the amine:

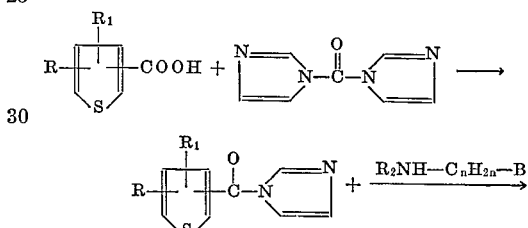

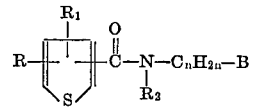

wherein R, $R_1$, $R_2$, $n$ and B are as defined above.

This reaction is best carried out in two steps and tetrahydrofuran is a satisfactory solvent. A temperature range of 25–75° C. is most desirable.

In still another method, the acid and amine are mixed and a carbodiimide derivative is added to effect condensation:

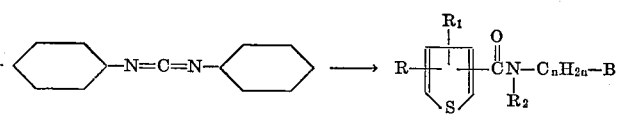

wherein R, $R_1$, $R_2$, $n$ and B are as hereinbefore defined.

This reaction may usually be carried out within a temperature range of 25–100° C. and the product is isolated by procedures well known to the art.

Thiophenecarboxamides may also be used as intermediates for alkylation procedures:

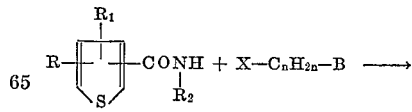

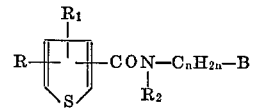

wherein R, $R_1$, $R_2$, B and $n$ are as defined hereinbefore and X is a reactive halogen, lower alkyl sulfonyloxy or monocyclic arylsulfonyloxy group. The amide is dissolved in an inert solvent, such as for example, diethyleneglycol dimethyl ether (diglyme) and treated with a condensing agent such as sodium hydride and then with an appropriate aminoalkyl derivative. The reaction may be best carried out at temperatures within the range of about 30°–200° C. for a period of from 30 minutes to 6 hours.

A further method of preparing the present compounds can be illustrated by the following procedures:

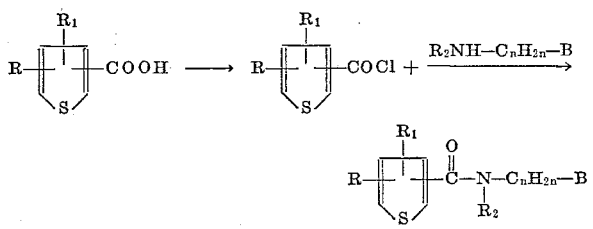

wherein R, $R_1$, $R_2$, B and $n$ are as defined hereinbefore.

In this process, a thiophenecarboxylic acid is treated with a halogenating agent such as thionyl chloride or phosphorous pentachloride, usually at room temperature in an inert solvent. The thiophenecarboxylic acid chloride is isolated and reacted with an alkylenediamine derivative. The products are recovered and purified by recrystallization from a suitable solvent. Alternatively, an acid anhydride in place of the acid chloride may be prepared as the intermediate.

The compounds of the present invention show central nervous system (CNS) depressant properties when given to warm-blooded animals. This activity is indicated by several procedures. For example, a test which indicates hypnotic and/or muscle relaxant type activity is represented by the following rod walking test. Groups of 6 mice each are tested for their ability to walk across a horizontal rod in a normal manner after receiving graded interperitoneal doses of a compound. A median effective rod walking dose (RWD) is estimated.

A test which indicates tranquilizing activity is represented by a measure of the reduction in motor activity. One half of the (RWD) dose is given to a group of 5 mice and a 5 minute count of motor activity is recorded (actophotometer). Counts of $\leqq 250$ are considered to indicate a specific reduction (more than two standard deviations) of activity at a dose causing only minimal impairment of neurological function as measured by rod walking ability. Compounds that appear to reduce motor activity ($\leqq 250$ count) are administered to additional groups of 5 mice at graded doses and tested similarly. The motor depression dose (MDD) which causes a 50% reduction of motor activity (a count of 250) is estimated. The use of reduced motor activity as a measure of tranquilizing activity has been described by W. D. Gray, A. C. Osterberg and C. E. Rauh, Archives Internationales et de Therapie, vol. 134, p. 198 (1961) and by W. J. Kinnard and C. J. Carr, Journal of Pharmacology and Experimental Therapeutics, vol. 121, p. 354 (1957).

As a test for toxicity or margin of safety, the compounds that did specifically reduce motor activity are given to 10 mice at a dose of $10\times$ MDD. The compounds that did not reduce motor activity are given to 10 mice at a dose of $4\times$ RWD. If more than 50% of the mice die within 24 hours, the compound is rejected for reasons of toxicity or low margin of safety. If $\leqq 50\%$ of the mice die, the compound is considered interesting for further study.

The (CNS) activity of representative compounds when tested by the above procedures is summarized in the following table:

TABLE

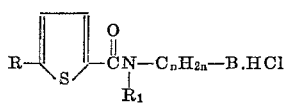

| R | $R_1$ | n | B | | | $MDD_{50}$, mg./kg. | $RWD_{50}$, mg./kg. | Safety percent dead/ dose, mg./kg. |
|---|---|---|---|---|---|---|---|---|
| H | H | 2 | N◯—◯ | | | 1.2 | 9.2 | 0 at 12. |
| H | H | 2 | N◯—◯ | | | 2.1 | 2.2 | 50 at 200. |
| H | H | 2 | N◯—◯—Cl | | | 14 | 40 | 0 at 140. |
| H | H | 3 | N◯—◯ | | | 2.6 | 30 | 0 at 26. |
| H | H | 3 | N◯—◯—Cl | | | 6 | 40 | 0 at 60. |
| H | H | 2 | N◯N—◯ | | | 9 | 60 | 50 at 112. |
| H | H | 2 | N◯N—◯ CH₃ | | | 3 | 10 | 0 at 30. |
| H | H | 2 | N◯N—◯ CF₃ | | | 4 | >100 | 0 at 300. |
| H | H | 2 | N◯N—◯—Cl | | | 12 | >100 | 0 at 120. |

TABLE—Continued

| R | R₁ | n | B | MDD₅₀, mg./kg. | RWD₅₀, mg./kg. | Safety percent dead/dose, mg./kg. |
|---|---|---|---|---|---|---|
| H | H | 2 |  (N-piperazinyl-phenyl-Cl) | 1.4 | 10 | 0 at 14. |
| H | H | 2 | 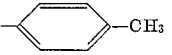 (N-piperazinyl-phenyl-CH₃) | 26 | >100 | 10 at 260. |
| H | H | 2 | 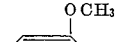 (N-piperazinyl-phenyl-OCH₃) | 9.8 | 50 | 0 at 98. |
| H | H | 3 |  (N-piperazinyl-phenyl) | 2 | 24 | 0 at 20. |
| H | H | 3 |  (N-piperazinyl-phenyl-Cl) | 4 | >100 | 0 at 40. |
| 5-Cl | H | 2 |  (N-piperazinyl-phenyl) | 8 | >100 | 0 at 80. |
| 5-Br | H | 2 |  (N-piperazinyl-phenyl) | 9 | >100 | 0 at 90. |
| H | CH₃ | 2 |  (N-piperazinyl-phenyl-CF₃) | >50 | 36 | 0 at 144. |

The products of the present invention can be incorporated in various pharmaceutical forms such as tablets, capsules, pills, and so forth, for immediate or sustained release, by combining with suitable carriers. The daily dose may vary from 10 mg. to 1000 mg. dependent upon the warm-blooded animal. They may be in the form of dosage units for single therapeutic dose or in small units for multiple dosages or in larger units for division into single doses. Obviously, in addition to the therapeutic agent, there may be present excipients, binders, fillers and other therapeutically inert ingredients necessary in the formulation of the desired pharmaceutical preparation.

DETAILED DESCRIPTION

The following specific examples illustrate the preparation of representative compounds of the present invention. Parts are by weight unless otherwise indicated.

EXAMPLE 1

Preparation of N-[2-(4-phenyl-1-piperazinyl)ethyl]-2-thiophenecarboxamide

A solution of 23.6 parts of 2-thenoylchloride in 200 parts of chloroform is added to a mixture of 34.5 parts of 2-bromoethylamine hydrobromide and 46 parts of sodium carbonate in 200 parts of water. The reaction mixture is stirred for 4 hours and the layers are separated. The aqueous layer is extracted with additional chloroform and the combined chloroform layers are dried over magnesium sulfate and concentrated to remove the solvent. The crystalline residue is recrystallized from benzene and N-(2-bromoethyl)-2-thiophenecarboxamide, melting point 133–134° C., is obtained.

A mixture of 5.7 parts of N-(2-bromoethyl)-2-thiophenecarboxamide, 7.5 parts of 1-phenylpiperazine and 200 parts of benzene is heated at reflux temperature for 5 hours and cooled. The benzene solution is washed with water and then dried over magnesium sulfate and concentrated to remove the solvent. The residue is triturated with hexane and the solid product is filtered off and then recrystallized from benzene by addition of ether. The N-[2-(4-phenyl-1-piperazinyl)ethyl]-2 - thiophenecarboxamide melts at 132–134° C. When the above compound is dissolved in benzene and ethanolic hydrogen chloride is added, the hydrochloride salt is obtained, melting point 241–243° C.

EXAMPLE 2

Preparation of N-[2-(3,6-dihydro-4-phenyl-1-(2H)-pyridyl)ethyl]-2-thiophenecarboxamide The above compound, melting point 110–112° C., is obtained when 4-phenyl-1,2,5,6-tetrahydropyridine is substituted for 1-phenylpiperazine in the procedure of Example 1. The hydrochloride salt melts at 224–227° C.

EXAMPLE 3

Preparation of N-[2-(4-m-trifluoromethylphenyl-1-piperazinyl)ethyl]-2-thiophenecarboxamide When 1-(m-trifluoromethylphenyl)piperazine is substituted for 1-phenylpiperazine in the procedure of Example 1, the above compound melting point 148–150° C., is obtained. The hydrochloride melts at 242–244° C.

EXAMPLE 4

Preparation of N-[2-(4-p-chlorophenyl-3,6-dihydro-1-(2H)-pyridyl)-ethyl]-2-thiophenecarboxamide If 4-(p-chlorophenyl)-1,2,5,6-tetrahydropyridine is substituted for 1-phenylpiperazine in the procedure of Example 1, the above compound, melting point 163–165° C., is obtained. The hydrochloride salt melts at 247–250° C.

EXAMPLE 5

Preparation of N-[3-(4-phenyl-1-piperazinyl)-propyl]-2-thiophenecarboxamide

A solution of 23.6 parts of 2-thenoyl chloride in 200 parts of chloroform is added to a mixture of 33 parts of 3-bromopropylamine hydrobromide and 46 parts of sodium carbonate in 200 parts of water and the mixture is stirred for 4 hours and filtered to remove insoluble material. The liquid layers are separated and the aqueous layer is extracted with chloroform. The chloroform layers are combined and concentrated to remove the solvent. The syrup is triturated with ether and filtered to remove insoluble material. The ether layer is concentrated and the residue is recrystallized from benzene by addition of hexane. The N-(3-bromopropyl)-2-thiophenecarboxamide melts at 46–49° C.

A mixture of 6 parts of N-(3-bromopropyl)-2-thiophenecarboxamide, 7.9 parts of 1-phenylpiperazine and 200 parts of benzene is heated at reflux temperature for 5 hours and cooled. The benzene layer is washed with water, dried over magnesium sulfate and concentrated to remove the solvent. The residue is triturated with hexane and the crystalline product is filtered off. Recrystallization from benzene by addition of hexane results in N-[3-(4-phenyl-1-piperazinyl)propyl] - 2 - thiophenecarboxamide melting at 117–119° C. The hydrochloride melts at 193–196° C.

EXAMPLE 6

Preparation of N-[3-(4-p-chlorophenyl-1-piperazinyl) propyl]-2-thiophenecarboxamide The above compound, melting point 142–144° C., is obtained when 1-(p-chlorophenyl)piperazine is substituted for 1-phenylpiperazine in the procedure of Example 5. The hydrochloride melts at 226–228° C.

EXAMPLE 7

Preparation of N[3-(3,6-dihydro-4-phenyl-1-(2H)-pyridyl)propyl]-2-thiophenecarboxamide When 4-phenyl-1,2,5,6-tetrahydropyridine is substituted for 1-phenylpiperazine in the procedure of Example 5, the above compound, melting point 103–105° C., is obtained. The hydrochloride melts at 193–195° C.

EXAMPLE 8

Preparation of N-[3-(4-p-chlorophenyl-3,6-dihydro-1-(2H)-pyridyl)propyl]-2-thiophenecarboxamide This compound, melting point 127–129° C., is obtained when 4-(p-chlorophenyl) - 1,2,5,6 - tetrahydropyridine is substituted for 1-phenylpiperazine in the procedure of Example 5. The hydrochloride melts at 197–199° C.

EXAMPLE 9

Preparation of N-[2-(4-phenylpiperidino)ethyl]-2-thiophenecarboxamide

The above compound is obtained when 4-phenylpiperidine is substituted for 1-phenylpiperazine in the procedure of Example 1. The hydrochloride melts at 236–238° C.

EXAMPLE 10

Preparation of N-[2-(4-m-chlorophenylpiperidino) ethyl]-2-thiophenecarboxamide

When 4-(m-chlorophenyl)piperidine is substituted for 1-phenylpiperazine in the procedure of Example 1, the above compound is obtained.

EXAMPLE 11

Preparation of N-[2-(4-m-trifluoromethylphenylpiperidino)ethyl]-2-thiophenecarboxamide The above compound is obtained when 1-phenylpiperazine is replaced by 4-(m-trifluoromethylphenyl)piperazine in the procedure of Example 1.

EXAMPLE 12

Preparation of N-[2-(4-p-tolylpiperidino)ethyl]-2-thiophenecarboxamide

If 4-(p-tolyl)piperidine is substituted for 1-phenylpiperazine in the procedure of Example 1, the above compound is obtained.

EXAMPLE 13

Preparation of N-[2-(4-phenyl-1-piperazinyl)ethyl]-3-thiophenecarboxamide

The above compound is obtained when N-(2-bromoethyl)-3-thiophenecarboxamide is treated with 1-phenylpiperazine by the procedure of Example 1.

EXAMPLE 14

Preparation of N-[2-(4-phenyl-1-piperazinyl)ethyl]-4-bromo-2-thiophene carboxamide This compound is obtained when 4-bromo-2-thenoyl chloride is substituted for thenoyl chloride in the procedure of Example 1.

EXAMPLE 15

Preparation of N-[2-(4-phenyl-1-piperazinyl)ethyl]-3,5-dichloro-2-thiophenecarboxamide If 3,5-dichloro-2-thenoyl chloride is substituted for 2-thenoyl chloride in the procedure of Example 1, this compound is obtained.

EXAMPLE 16

Preparation of N-[2-(4-phenyl-1-piperazinyl)ethyl]-4-chloro-5-ethyl-2-thiophenecarboxamide The compound is obtained when 4-chloro-5-ethyl-2-thenoyl chloride is substituted for thenoyl chloride in the procedure of Example 1.

EXAMPLE 17

Preparation of N-[2-(4-phenyl-1-piperazinyl)ethyl]-5-fluoro-2-thiophenecarboxamide When 5-fluoro-2-thenoyl chloride is substituted for thenoyl chloride in the procedure of Example 1, this compound is obtained.

EXAMPLE 18

Preparation of N-[2-(3,6-dihydro-4-phenyl-1-(2H)-pyridyl)ethyl]-5-chloro-2-thiophenecarboxamide The above compound is obtained when N-(2-bromoethyl)-5-chloro-2-thiophenecarboxamide is treated with 4-phenyl - 1,2,5,6 - tetrahydropyridine by the procedure of Example 1.

EXAMPLE 19

Preparation of N-[2-(4-p-chlorophenyl-1-piperazinyl) ethyl]-2-thiophenecarboxamide hydrochloride The above compound, melting point 259–262° C., is obtained when 1-(p-chlorophenyl)piperazine is substituted for 1-phenylpiperazine in the procedure of Example 1.

EXAMPLE 20

Preparation of N-[2-(4-m-tolyl-1-piperazinyl)ethyl]-2-thiophenecarboxamide

When 4-(m-tolyl)piperazine is substituted for 1-phenylpiperazine in the procedure of Example 1, this compound is obtained. The hydrochloride melts at 259–262° C.

EXAMPLE 21

Preparation of N-[2-(4-m-chlorophenyl-1-piperazinyl) ethyl]-2-thiophenecarboxamide If 1-(m-chlorophenyl)piperazine is substituted for 1-phenylpiperazine in the procedure of Example 1, this compound is obtained. The hydrochloride melts at 256–259° C.

EXAMPLE 22

Preparation of N-[2-(4-p-tolyl-1-piperazinyl)ethyl]-2-thiophenecarboxamide hydrochloride The above compound, melting point 264–267° C., is obtained when 1-(p-tolyl)piperazine is substituted for 1-phenylpiperazine in the procedure of Example 1.

EXAMPLE 23

Preparation of N-[2-(4-m-methoxyphenyl-1-piperazinyl) ethyl]-2-thiophenecarboxamide This compound is obtained when 1-(m-methoxyphenyl)-piperazine is substituted for 1-phenylpiperazine in the procedure of Example 1. The hydrochloride melts at 231–233° C.

EXAMPLE 24

Preparation of N-[2-(3,6-dihydro-4-m-trifluoromethylphenyl-1-(2H)-pyridyl)ethyl]-2-thiophenecarboxamide When 4-(m-trifluoromethylphenyl)-1,2,5,6-tetrahydropyridine is substituted for 1-phenylpiperazine in the procedure of Example 1, this compound is obtained.

EXAMPLE 25

Preparation of N-[4-(4-phenyl-1-piperazinyl)butyl]-2-thiophenecarboxamide

The above compound is obtained when N-(4-bromopropyl)-2-thiophenecarboxamide and 1-phenylpiperazine are treated by the procedure of Example 1.

EXAMPLE 26

Preparation of N - methyl - N - [2 - (4 - m - trifluoromethylphenyl - 1 - piperazinyl)ethyl] - 2 - thiophenecarboxamide hydrochloride A mixture of 15.4 parts of 1-(m-trifluoromethylphenyl)-piperazine, 6.8 parts of N-(2-chloroethyl)-N-methyl-2-thiophenecarboxamide, and 150 parts of benzene are heated at reflux temperature for 8 hours and then filtered. The mother liquor is concentrated to remove the solvent. The residue is washed several times with hexane and then dissolved in ether. Alcoholic hydrogen chloride is added and a precipitate forms. The precipitate is filtered off and recrystallized twice from ethanol. The N - methyl - N - [2 - (4 - m - trifluoromethylphenyl - 1-piperazinyl)ethyl]-2-thiophenecarboxamide hydrochloride melts at 192–194° C.

EXAMPLE 27

Preparation of N-allyl-N-[2-(4-phenyl-1-piperazinyl)ethyl]-2-thiophenecarboxamide The above compound is obtained when 1-phenylpiperazine and N-allyl-N-(2-chloroethyl)-2-thiophenecarboxamide are reacted by the procedure of Example 26.

EXAMPLE 28

Preparation of N-[2-(4-phenyl-1-piperazinyl)ethyl]-2-thiophenecarboxamide hydrochloride A mixture of 15 parts of 1-(2-aminoethyl)-4-phenylpiperazine, 25 parts of sodium carbonate, 150 parts of water and 300 parts of benzene is cooled and stirred as a solution of 10 parts of 2-thenoyl chloride in 100 ml. of benzene is added. The mixture is stirred for 5 hours and the layers are separated. The benzene layer is washed with water and then concentrated. The residue is triturated with hexane and the solid product is filtered off and recrystallized from benzene by addition of ether. The product is dissolved in benzene and ethanolic hydrogen chloride is added. The crystalline product is filtered off and melts at 241–243° C.

EXAMPLE 29

Preparation of N-[2-(4-m-methylthiophenyl-1-piperazinyl)ethyl]-2-thiophenecarboxamide This compound is obtained when 1-(m-methylthiophenyl)-piperazine is substituted for 1-phenylpiperazine in the procedure of Example 1.

EXAMPLE 30

Preparation of 5-chloro-N-[2-(4-phenyl-1-piperazinyl)ethyl]-2-thiophenecarboxamide A mixture of 6.80 parts of 5-chlorothiophene-2-carboxylic acid, 7.50 parts of 95% N,N'-carbonyldiimidazole, and 50 parts of tetrahydrofuran is allowed to stand at room temperature for one hour and 8.55 parts of 2-(4-phenyl-1-piperazinyl)ethylamine is added. The mixture is left at room temperature overnight, the solvent is distilled off, and 250 parts of 0.2 N sodium hydroxide is added. The mixture is extracted with chloroform and the chloroform layer is concentrated. The residue is recrystallized from ethyl acetate in order to obtain the 5-chloro-N-[2-(4 - phenyl - 1 - piperazinyl)ethyl] - 2 - thiophenecarboxamide, melting point 162–164° C. The hydrochloride salt melts at 245–247° C.

EXAMPLE 31

Preparation of 5-bromo-N-[2-(4-phenyl-1-piperazinyl)ethyl]-2-thiophenecarboxamide This compound, melting point 165–167° C., is obtained when 5-bromothiophene-2-carboxylic acid is substituted for 5-chlorothiophene-2-carboxylic acid in the procedure of Example 30.

What is claimed is:

1. A compound selected from the group consisting of compounds of the formula:

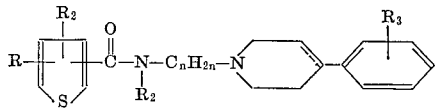

wherein R and $R_1$ are selected from the group consisting of hydrogen, n-lower alkyl and halogen; $R_2$ is selected from the group consisting of hydrogen, lower alkyl and lower alkenyl; $R_3$ is hydrogen, lower alkoxy, lower alkyl, thio-lower alkyl, halo and trifluoromethyl; $n$ is an integer from 2 to 4, —— is a single or double bond and pharmaceutically aceptable acid addition salts.

2. The compound in acordance with claim 1: N-[2-(3,6 - dihydro - 4 - phenyl - 1 - (2H) - pyridyl)ethyl] - 2-thiophenecarboxamide.

3. The compound in accordance with claim 1: N-[3-(3,6 - dihydro - 4 - phenyl - 1 - (2H) - pyridyl)propyl] - 2-thiophenecarboxamide.

4. The compound in accordance with claim 1: N-[2-(4-phenylpiperidino)ethyl]-2-thiophenecarboxamide.

References Cited

UNITED STATES PATENTS

| | | | |
|---|---|---|---|
| 2,647,120 | 7/1953 | Williamson | 260—268 X |
| 2,684,369 | 7/1954 | Leonard | 260—268 X |
| 3,005,821 | 10/1961 | Hayao | 260—268 |
| 3,030,366 | 4/1962 | Biel | 260—268 |

DONALD G. DAUS, Primary Examiner

U.S. Cl. X.R.

260—268, 294.8, 309, 332.2; 424—250, 263, 267